United States Patent [19]

Branscum

[11] 3,791,547
[45] Feb. 12, 1974

[54] ICE CHEST CONSTRUCTION

[75] Inventor: Tony E. Branscum, Winfield, Kans.

[73] Assignee: Gott Manufacturing Co., Inc., Winfield, Kans.

[22] Filed: Feb. 25, 1972

[21] Appl. No.: 229,522

[52] U.S. Cl............................ 220/17, 62/371, 206/4, 220/9 F
[51] Int. Cl............................................. B65d 25/14
[58] Field of Search 220/9 F, 9 G, 17, 42 C, DIG. 18; 206/4; 62/371, 372

[56] References Cited
UNITED STATES PATENTS

| 3,684,123 | 8/1972 | Bridges | 206/4 |
|---|---|---|---|
| 372,233 | 10/1887 | Northrop | 220/17 |
| 3,327,841 | 6/1967 | Schurman et al. | 206/4 |
| 3,251,460 | 5/1966 | Edmonds | 220/72 |
| 3,094,448 | 6/1963 | Cornelius | 220/9 F |
| 3,426,889 | 2/1969 | Fuller | 206/4 |
| 2,543,839 | 3/1951 | Faris | 220/42 C |

Primary Examiner—Herbert F. Ross
Attorney, Agent, or Firm—Lowe, Kokjer, Kircher, Wharton and Bowman

[57] ABSTRACT

An insulated container has superior insulating qualities and greater strength as a result of a novel lid and receptacle construction. The receptacle is a box-like structure the sidewalls of which terminate in a curved, generally convex surface. A lid is adapted to be received on the receptacle to close the opening. The lid has an arcuate, generally concave face which is complemental to the surface of the receptacle and provides a substantial area of contact between the lid and receptacle. The area of contact between the lid and receptacle is further increased by a rib which extends around the lid on the inside of the latter and is adapted to engage the receptacle. The aforementioned rib is disposed in parallel relationship to an overhanging lip which comprises the terminal edge of the lid and cooperates with the walls of the receptacle to present a relatively flush side of the container. The rib is so disposed relative to the lip to provide reinforcing which increases the strength of the lip. The construction also minimizes the width of the thin lip and thus facilitates molding from a high-strength material such as polyethylene.

6 Claims, 7 Drawing Figures

PATENTED FEB 12 1974 3,791,547

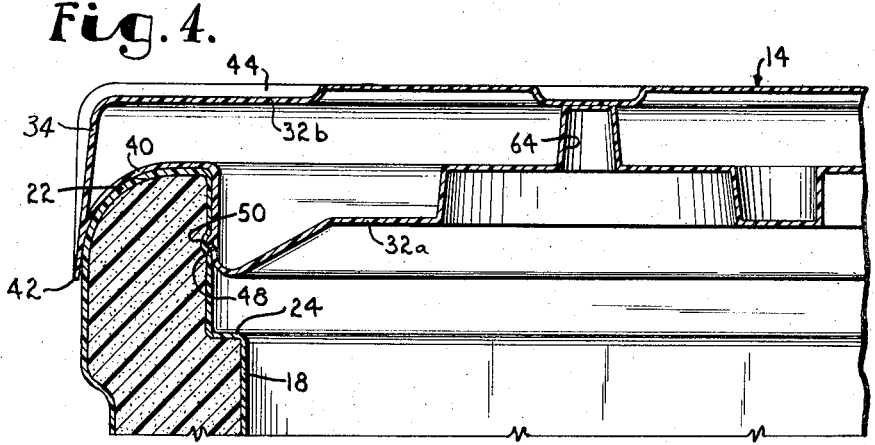
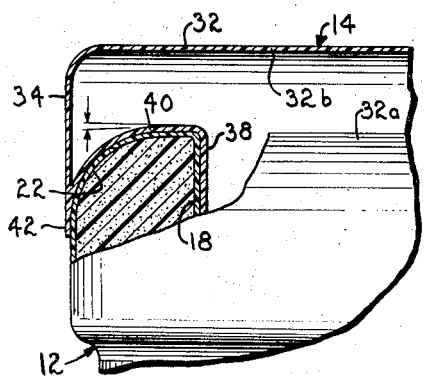
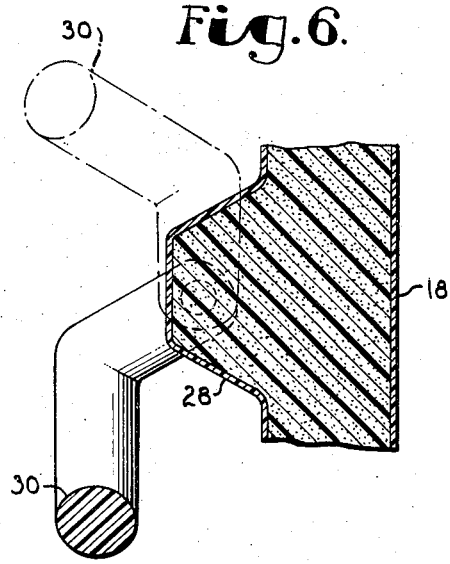
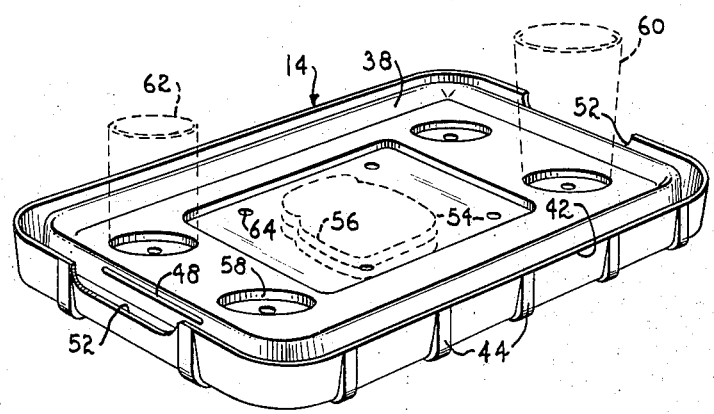

3,791,547

ICE CHEST CONSTRUCTION

This invention relates to the container art and, more particularly, to an improved form of insulated container having a removable lid which fits onto a receptacle.

In recent years, insulated containers of the type frequently referred to as "ice chests" have become an extremely popular means of containing food outside of a refrigerator. The wide acceptance of these containers has largely been attributable to the availability of cellular materials having superior insulating properties from which such containers can be economically constructed. A common deficiency among the many ice chest constructions using available insulating foams and the like has been the overall lack of strength which greatly limits the serviceability of the container. It has also been found that in many insulated container constructions, the greatest loss of insulating properties occurs at the point of engagement of the lid of the container with the receptacle.

It is, therefore, an object of the present invention to provide an insulated container having superior insulating properties because of a substantial area of contact between the container lid and the receptacle of the container, which greatly reduces heat transfer at the point of engagement of the lid with the receptacle.

Still another object of this invention is to provide a container having a receptacle and a lid for the receptacle wherein the container construction avoids wide thin edges and can therefore be easily molded from a material such as polyethylene.

It is also an aim of this invention to provide an insulated container having a receptacle and a removable lid wherein the strength of the lid is substantially increased by a novel type of construction which distributes forces from the outermost edges of the lid to a reinforcing rib which is spaced inwardly from the outside edges.

Still another one of the objectives of this invention is to provide an insulated container having a receptacle and a lid for the receptacle wherein heat transfer at the point of engagement of the lid with the receptacle is substantially reduced because of positive locking structure which holds the lid in place but does not require mechanical fasteners or the like which must be hand operated.

Yet another one of the aims of this invention is to provide a container as described in the foregoing objects wherein the lid of the container is capable of withstanding substantially greater forces because of structure which distributes these forces over the entire area of the lid.

In the drawings:

FIG. 4 is an enlarged, fragmentary, cross-sectional view taken along line 4—4 of FIG. 3;

FIG. 5 is another fragmentary, cross-sectional view taken along line 5—5 of FIG. 3;

FIG. 6 is yet another enlarged, fragmentary, cross-sectional view showing details of the handle construction; and FIG. 7 is a perspective view of the lid of the container in an inverted position to show details of the food tray which is provided by the lid.

Figure 1:
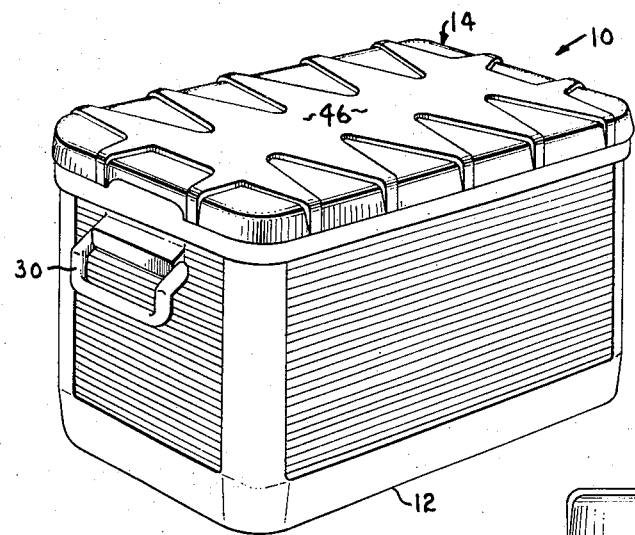
FIG. 1 is a perspective view of a container constructed according to the teachings of the present invention.
Figure 2:
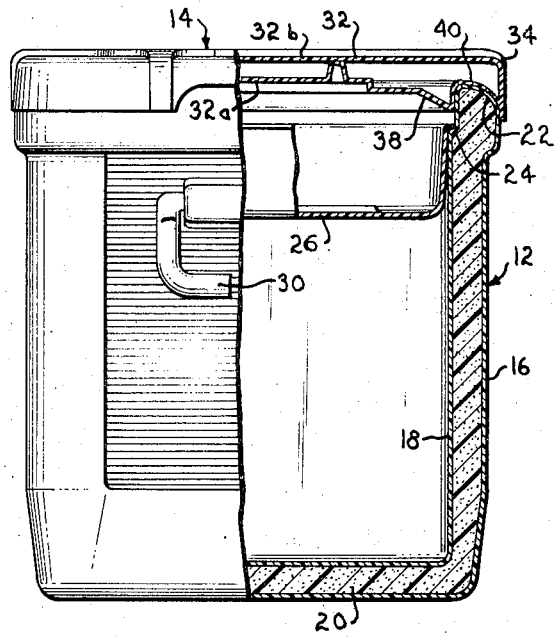
FIG. 2 is an end elevational view of the container shown in FIG. 1 with portions being broken away to illustrate the interior construction of the container.

Referring initially to FIGS. 1 and 2, the container of the present invention is designated generally by the numeral 10 and includes an open-top, box-like receptacle designated generally by the numeral 12 and a lid for closing the receptacle designated generally by the numeral 14.

Receptacle 12 is generally rectangular and comprises an outer wall 16 which is preferably constructed from a relatively rigid high-strength material such as polyethylene, and an inner wall 18 presented by a liner which is also preferably constructed from polyethylene. The outer wall 16 and inner wall 18 are normally integral with one another and the area between the two is filled with an insulating material 20 such as polyurethane foam. The inner and outer walls of receptacle 12 terminate in a generally convex, arcuate surface 22 which surface defines the opening of the container. The wall 18 also presents a circumscribing shoulder 24 near the top of the receptacle for supporting a tray 26 which may be used to contain articles of food. Furthermore, as best illustrated in FIG. 6, outer wall 16 includes an integral outturned projection 28 at each end of the receptacle which projections serve as mounting brackets for a pair of handles 30. The handles are journalled in the projections and are movable through an arc of approximately 120° from the solid line position shown in FIG. 6 to the broken line position.

Figure 3:
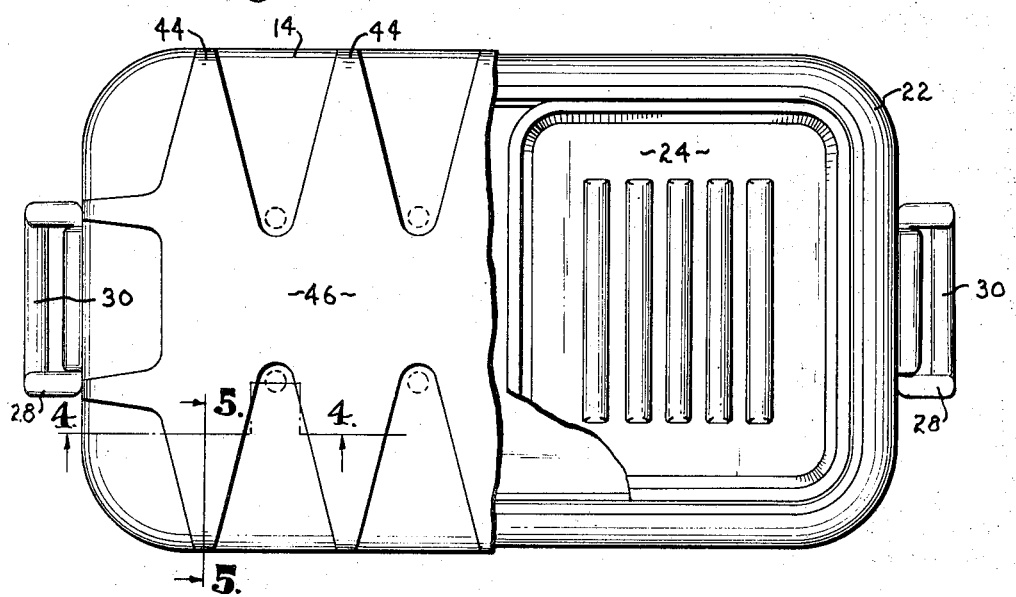
FIG. 3 is a top plan view of the container with portions again broken away to show details of construction.

Referring additionally to FIGS. 3–5, lid 14 is comprised of a first generally planar lid portion 32 which spans the distance between the side walls of receptacle 12 and is integral with a second lid portion 34 which overlies the side walls of receptacle 12. The first lid portion 32 includes a spaced apart inner and outer wall, 32a and 32b, respectively, and a peripherally extending rib 38 which presents a planar surface adapted to engage inner wall 18 of receptacle 12. The second lid portion 34 includes a generally concave arcuate inner face 40 which is complemental to surface 22 and extends around the periphery of the lid for engagement with surface 22 when the lid is placed on the receptacle. Face 40 terminates in a longitudinally extending lip 42 which overhangs receptacle 12 and cooperates with outer wall 16 to present a pair of relatively flush sides of container 10. It is, however, to be noted that face 40 merges into lip 42 immediately adjacent the terminal edge of the latter to increase the transverse dimension of the lip. Also, second lid portion 34 extends upwardly from lip 42 and away from face 40 thus resulting in the transverse dimension of portion 34 being greatest at some point between the ends of face 40. This provides structure in "backing relationship" to face 40 for increasing the strength of the lid.

The outside of lid 14 is provided with a plurality of integral reinforcing fingers 44 which are rigid with and extend across both lid portions 32 and 34 and terminate at lip 42. The reinforcing fingers 44 extend perpendicular to the lip 42 and thus serve to distribute forces at the edges toward the center of the lid. The reinforcing fingers merge at the center of lid 14 into an elevated area 46 which spans the length of outer wall 32b to further serve to distribute forces over the entire lid.

At opposite ends of lid 14, rib 38 is provided with a protuberance 48 which is received within a complemental recess 50 in wall 18 when lid 14 is positioned to close the opening of receptacle 12. This positively locks the lid on the receptacle. It is also to be noted that the arcuate dimension of face 40 is slightly greater at the ends of receptacle 12 so that lip 42 is spaced from the receptacle at the ends thereby facilitating lifting of the lid off of the receptacle. To this end, each lid has a cutout section 52 where a person may insert his hands to lift the lid.

Referring additionally to FIG. 7, it is to be noted that when lid 14 is inverted from its normal position closing the opening of receptacle 12, the lid may serve as a tray for holding articles of food. A generally rectangular recess 54 in the center of the lid conveniently holds a sandwich 56 or the like and a plurality of circular recesses 58 surrounding recess 54 serve as coasters for drink containers such as 60 and 62. A plurality of "welds" 64 interconnect walls 32a and 32b and are preferably located in the center of recesses 58 as well as around the outside of rectangular recess 54.

Container 10 is normally used with a quantity of ice in the bottom of the container and articles of food or drink disposed above. Tray 24 is particularly useful for holding sandwiches or the like above the ice to prevent direct contact with water. It has been found that construction of lid 14 from integral molded portions 32 and 34 results in superior insulating properties as well as added strength. The insulating quality of container 10 is paritcularly superior with regard to heat transfer between lid 14 and receptacle 12. This is due to the substantial area of contact between the lid and the receptacle as a result of arcuate surface 26 being in engagement with the complemental face 40, and rib 38 engaging the inside wall of the receptacle. The configuration of the arcuate surface 26 and the complemental configuration of face 40 also absolutely precludes the entrance of moisture to the interior of container 10 from the outside. Because of the parallel relationship of rib 38 with the lip 42 and the intercoupling of these respective components by face 40, the strength of lip 42 is substantially increased. Any forces acting against lip 42 will be partially transferred to rib 38 and partially to the first lid portion 32 through fingers 44. The construction of lid 14 is particularly adapted to molding from material such as polyethylene because of the absence of wide thin edges.

Having thus described the invention, what is claimed as new and desired to be secured by Letters Patent is:

1. A container comprising:
   a receptacle for containment of objects,
   said receptacle having inner and outer sidewalls terminating in a continuous edge presenting a convex surface and defining an opening;
   a first lid portion spanning the distance between said inner sidewalls to at least partially close said opening; and
   a second lid portion integral with said first lid portion and extending around the perimeter of the latter,
   said second lid portion having a concave inner face terminating in an exterior vertical surface, said concave inner face being disposed for sealing engagement with said convex surface to provide a substantial area of contact between said second lid portion and said receptacle the periphery of said second portion terminating in a lip vertically overlapping the outer sidewalls of said receptacle and cooperating with the latter to present a relatively flush side of said container, said first lid portion including spaced apart inner and outer walls, said inner wall having a rib extending around its perimeter and also having an interior vertical surface extending downwardly from said inner face for sealing engagement with said inner sidewall as the lid approaches said convex surface,
   said second portion including structure disposed in backing relationship to said inner face whereby the transverse dimension of said second portion attains its maximum at the outer periphery of the lid.

2. The invention of claim 1, wherein said receptacle is of generally rectangular configuration, and said lip extends beyond said receptacle at opposite ends of the latter to facilitate lifting of the lid off of the receptacle.

3. The invention of claim 2, wherein are included protuberances along said rib at opposite ends of said first portion, and complemental recesses in said receptacle for receiving said protuberances whereby when said lid portions are received on said receptacle said protuberances and said recesses cooperate to lock said lid portions in place.

4. The invention of claim 1, wherein said first lid portion includes a plurality of recesses within the area enclosed by said rib for holding articles of food when said first portion is inverted to serve as a food tray.

5. The invention of claim 4, wherein is included a plurality of reinforcing fingers integral with said first and second portions and extending from said lip to the center of said first portion where all of the fingers merge into a common planar reinforcing area extending substantially the length of the lid.

6. The invention of claim 1, wherein said sidewalls are comprised of spaced apart wall sections and including a layer of insulating material between said sections.

* * * * *